2,891,971

ANTHRAQUINONE PIGMENT DYESTUFFS

Josef Singer, Leverkusen-Wiesdorf, and Otto Bayer and Heinz-Werner Schwechten, Leverkusen - Bayerwerk, Germany, assignors to Farbenfabriken Bayer Aktiengesellschaft, Leverkusen, Germany, a corporation of Germany No Drawing. Application July 24, 1952
Serial No. 300,754

Claims priority, application Germany August 1, 1951

6 Claims. (Cl. 260—377)

The present invention relates to a process of producing pigment dyestuffs.

In accordance with the invention we have found that valuable solvent resistant pigment dyestuffs are obtained by reacting polyfunctional compounds and 1.4-diamino-anthraquinones carrying at each nitrogen atom at least one free hydrogen atom and furthermore, at one or both NH-groups, organic radicals which contain altogether at least two amino groups.

Compounds suitable as starting materials are preferably prepared by condensation of quinizarin, leuco quinizarin or leuco 1.4-diamino-anthraquinone with an excess of polyamines. In the reaction of one mol of leuco amine with at least two mols of aliphatic, cycloaliphatic, aromatic, araliphatic or mixed cycloaliphatic-aromatic diamines, the symmetrical 1.4-diamino derivatives containing two external amino groups are obtained. By reacting leuco diamine and 1 mol of a tri- or polyamine and, optionally, another mol of an aliphatic or aromatic monoamine, unsymmetrical starting materials are obtained. Suitable diamines reacting with 1.4-leuco diamines include ethylene diamine, hexamethylene diamine, 1.2-diamino-3-hydroxypropane, hexahydro-phenylene diamines, hexahydro-benzidine, perhydro-naphthalene diamines, N-methyl-1.3-propylene diamine, 3-amino-1-α-aminoethyl-benzene and Spermin (ω.ω'-diamino-dipropyl-diamino-butane). The reaction is preferably carried out in a solvent, for instance in nitrobenzene, chlorobenzene or water at temperatures up to about 200° C.

Particularly useful dyestuffs are obtained according to the invention from the reaction products of diamines containing amino groups attached to a secondary carbon atom.

Suitable cross-linking components are, in the first line, polyfunctional compounds which are capable of forming poly-addition products and generally reducing the basicity of the external amino groups. As examples may be named aliphatic and aromatic diisocyanates, pyromellitic acid dianhydride, and bis-ethylene-oxide compounds. Further may be used the phenyl esters of dicarboxylic acids, oxalic esters, diphenyl carbonate, methane-tricarboxylic acid esters, melamine-hexamethylol-methyl-ether, benzene disulfoethylene imide, benzene disulfochloride, cyanuric chloride, terephthaloyl chloride and 1.3.5-triacryloyl perhydro-s-triazine. Depending on the solubility properties and the reactivity of the individual compounds the increase in molecular weight of the basic 1.4-diamino-anthraquinone derivatives may be accomplished in an aqueous suspension or in an organic solvent. The increase in molecular weight can also be effected by condensing the starting materials, if necessary after appropriately transforming the NH$_2$-groups, with typical resin formers, for instance condensing the compound of the formula

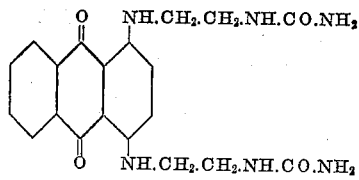

with dimethylol urea.

The effect thus obtained is evident since the starting materials, in general, easily dissolve in organic solvents whereas the condensation products are practically insoluble in all solvents. This simple process carried out on the base of the technically readily available 1.4-di-amino-anthraquinone allows the production of high grade violet, blue and green pigment dyestuffs for the most various fields of application.

The present invention is further illustrated by the following examples without being restricted thereto, the parts being by weight.

Example 1

32 parts of 1.4-bis-aminoethylamino-anthraquinone (obtained by mixing leuco 1.4-diamino-anthraquinone and 10 times the quantity of ethylene diamine and subsequent oxidation of the resulting leuco compound by introducing air) are dissolved in 300 parts of nitrobenzene and mixed with 20 parts of diphenyl carbonate at elevated temperatures, say about 100–150° C. The polyurea precipitates soon as a blue deposit which is filtered off, washed with methanol and dried.

The pigment thus obtained is very slightly soluble in hot nitrobenzene and dissolves in concentrated sulfuric acid with a violet coloration.

When replacing in the above reaction diphenyl carbonate by oxalic acid dimethyl ester a pigment of similar properties is obtained. The reaction of terephthalic acid chloride and pyridine gives rise to a pigment of good resistance to solvents.

Example 2

43 parts of the dyestuff of the formula

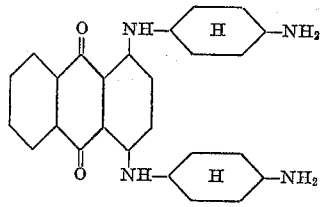

(obtained by heating leuco 1.4-diamino-anthraquinone and 10 times the quantity of hexahydro-p-phenylene diamine to 110° C. and subsequent treatment with air at 100° C.) are dissolved in 100 parts of nitrobenzene and reacted on the water bath (or by heating at temperatures up to about 120° C.) with 175 parts of a mixture of 2.4- and 2.6-toluylene diisocyanate. A blue fine-grained precipitate of the polyurea immediately forms which is filtered off, washed with methanol and dried. The pigment thus obtained is insoluble in the usual solvents and distinguished by an especially good fastness to light and brilliant shade.

Other di- or polyisocyanates and other dyestuff diamines such as 1.4-bis-aminoethylamino-anthraquinone and 1.4-bis-p-amino-phenylamino-anthraquinone may also be used in the reaction.

According to another embodiment of the above reaction an aqueous solution of 1.4-bis-aminoethylaminoanthraquinone is treated with the potassium bisulfite addition compound of hexamethylene diisocyanate on the water bath; a brilliant blue pigment is also obtained in this case.

Example 3

A solution of 43 parts of the dyestuff of the formula indicated in Example 2 and 25 parts of 1.3.5-triacryloyl-perhydro-s-triazine in 1000 parts of water and 15 parts of glacial acetic acid is neutralized with sodium carbonate and stirred at 50–80° C. until the resulting precipitate has become insoluble in acid. The reaction product is then filtered off, washed with water and dried. The blue colored pigment obtained is insoluble in organic solvents and concentrated sulfuric acid.

We claim:

1. The process for the production of pigment dyestuffs which comprises reacting at temperatures up to about 150° C. an anthraquinone derivative of the general formula

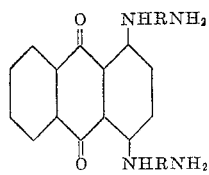

wherein R stands for a radical selected from the group consisting of alkylene, phenylene and hexahydrophenylene radicals with a compound selected from the group consisting of the dicarboxylic acid chlorides, the dicarboxylic acid esters, organic diisocyanates and diphenyl carbonate.

2. The process in which the compound of the formula

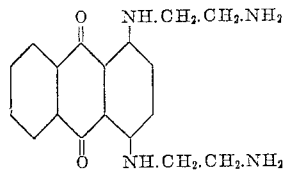

is heated with diphenyl carbonate at temperatures up to about 150° C.

3. The process in which the compound of the formula

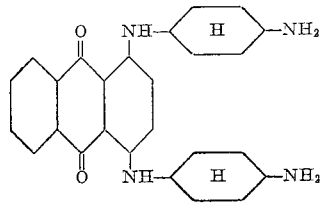

is heated with an organic diisocyanate at temperatures up to about 120° C.

4. A new pigment dyestuff obtained by reacting at temperatures up to about 120° C. the compound of the formula

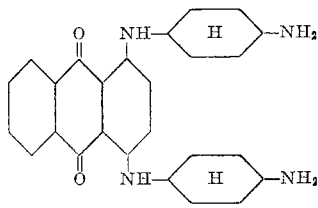

with an organic diisocyanate.

5. A new pigment dyestuff obtained by reacting at temperatures up to about 150° C. the compound of the formula

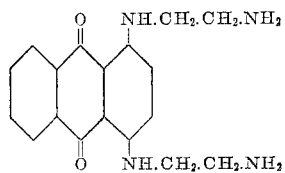

with diphenyl carbonate.

6. New pigment dyestuffs obtained by reacting at temperatures up to about 150° C. anthraquinone derivatives of the general formula

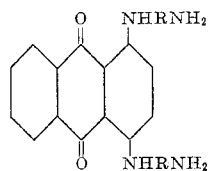

wherein R stands for a radical selected from the group consisting of alkylene, phenylene and hexahydrophenylene radicals with a compound selected from the group consisting of the dicarboxylic acid chlorides, the dicarboxylic acid esters, organic diisocyanates and diphenyl carbonate.

References Cited in the file of this patent

FOREIGN PATENTS 449,477    Great Britain _____ 1936